United States Patent
Letourneur et al.

(10) Patent No.: US 6,822,128 B2
(45) Date of Patent: Nov. 23, 2004

(54) FLOW CONTROL IN A THREE-PHASE MONOLITHIC CATALYST REACTOR

(75) Inventors: Didier Letourneur, Samoreau (FR); Charles M. Sorensen, Jr., Corning, NY (US); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 387 days.

(21) Appl. No.: 10/027,645

(22) Filed: Dec. 20, 2001

(65) Prior Publication Data

US 2002/0119082 A1 Aug. 29, 2002

Related U.S. Application Data (60) Provisional application No. 60/258,367, filed on Dec. 27, 2000.

(51) Int. Cl.⁷ .............................. C07C 5/02; B01J 8/04
(52) U.S. Cl. ..................... 585/263; 585/265; 585/926; 208/143; 208/108; 208/213; 422/190; 422/191; 568/924; 564/395; 570/190
(58) Field of Search ................................. 585/263, 265, 585/926; 208/143, 108, 213; 422/190, 191; 568/924; 564/395; 570/190

(56) References Cited

U.S. PATENT DOCUMENTS

| | | |
|---|---|---|
| 5,099,085 A | 3/1992 | Strasser et al. |
| 5,637,286 A | 6/1997 | Turunen |
| 6,005,143 A | 12/1999 | Machado et al. |
| 6,211,255 B1 | 4/2001 | Schanke et al. |
| 6,262,131 B1 | 7/2001 | Arcuri et al. |
| 6,375,920 B2 | 4/2002 | Fischer et al. |

FOREIGN PATENT DOCUMENTS

EP 0 384 905 8/1989

OTHER PUBLICATIONS

Edvinsson et al., "A comparison between monolithic reactor and the trickle–bed reactor for liquid–phase hydrogenations", Catalysis Today 24, 1995, pp. 173–179.

Irandoust et al., "The Use of Monolithic Catalysts for Three–Phase Reactions", Structured Catalysts and Reactors, Marcel Dekker Inc., 1998, pp. 239–265.

*Primary Examiner*—Walter D. Griffin
(74) *Attorney, Agent, or Firm*—Kees van der Sterre (57) ABSTRACT

A method is disclosed for maintaining a volumetric gas to liquid ratio in a segmented gas/liquid flow along a reactor of monolithic catalyst beds in series. The present invention includes the steps of: initiating the segmented gas/liquid flow at a first end of the reactor by introducing feed liquid and feed gas both at a predetermined volume and a predetermined flow rate; injecting an additional amount of gas at least once into any of the spaces between catalyst beds; and combining the segments of the segmented gas/liquid flow at a second end of the reactor. The injection of gas is controlled such that the segmented gas/liquid flow can be maintained near or at the Taylor regime.

20 Claims, 3 Drawing Sheets

(A) SLUG FLOW (B) TAYLOR FLOW

FLOW CONTROL IN A THREE-PHASE MONOLITHIC CATALYST REACTOR

This application claims the benefit of U.S. Provisional Application No. 60/258,367, filed Dec. 27, 2000, entitled "Flow Control in a Three-Phase Monolithic Catalyst Reactor", by Letourneur et al.

BACKGROUND OF THE INVENTION

Three-phase commercial chemical processes that include a gas, a liquid, and a solid catalyst are typically carried out in slurry reactors or packed bed reactors. In a slurry reactor, a solid catalyst is suspended by some means of agitation in a reaction vessel containing the gas and a relatively large volume of liquid. In a packed bed reactor, a solid catalyst is stationary within a vessel under the pressure of a gas, and a liquid is supplied to the catalyst in forms such as a trickle or film.

Typically, mass transfer processes in the reaction vessel limit rates of reaction; thus, promotion of mass transfer is an important factor in choosing a reactor for commercial processes. In addition, due to safety concerns and energy costs, the ability for a reactor to dissipate heat is also important. Other factors to consider in choosing a reactor are manipulation of the catalyst, maintenance of the reactor, and recovery of the often expensive catalyst. For a more detailed discussion of the common chemical reactors see A. Gianetto and P. L. Silveston, Multiphase Chemical Reactors: Theory, Design, Scale-Up, Hemisphere, N.Y., 1986.

Slurry reactors are often used in chemical industrial processes because they have superior mass transfer attributes. Some commercial three-phase processes that employ slurry reactors are the hydrogenation of unsaturated fats and the oxidation of alkenes. Typically, there is a much greater amount of liquid than solid in a slurry reactor, and the agitation to suspend the catalyst results in high velocity flow of the liquid. Therefore slurry reactors have excellent mass transfer attributes and relatively high dissipation efficiency.

The immersion of heat exchangers in slurry reactors is usually not problematic, and this further increases their advantages in heat dissipation. However, one problem with slurry reactors is that there is usually a relatively small amount of catalyst present in the reactor. This can lead to decreased efficiency compared to processes requiring no agitation.

Another disadvantage of such reactors comes in the catalyst recovery stage, since the finely divided particles are often difficult to filter on a large scale. Additionally, if the catalyst is pyrophoric, the filtration recovery phase can raise serious hazard concerns. In general, the above mentioned problems with slurry reactors can make large scale-ups a challenging endeavor.

Packed bed reactors are also common for three-phase commercial processes, examples of such reactions including hydroprocessing, hydrogenation, and oxidation processes. The most common type of packed bed reactor employs a tightly packed catalyst bed onto which a liquid is introduced as a trickle and flows downward by gravity. A reactant gas is also fed co-currently and its flow is driven by pressure drop.

Since liquid being processed in such reactors is introduced into a stationary bed of catalyst and no agitation is required, the reactor can provide a relatively high volume ratio of catalyst to liquid feedstock.

One problem with packed bed reactors is that they must be packed and maintained with high uniformity to avoid the formation of channels through the bed. Another disadvantage to packed bed reactors is that the beds can become plugged when small diameter particles are used. This problem can be mitigated by the use of larger particles, but this strategy will also reduce the efficiency of the bed. As with slurry reactors, the problems mentioned above with packed bed reactors can make scale-up difficult.

Monolithic catalyst reactors for three-phase chemical reactions offer a number of advantages over slurry and packed bed reactors while avoiding some of the disadvantages. In monolithic catalysts of honeycomb type, the catalyst is formed of, dispersed within, or manufactured as monolithic honeycomb structures comprising a plurality of parallel channels formed by intersecting channel walls running from one end of the structure to the other. The channels can have any of a number of cross-sectional shapes, including triangles squares, rectangles, and hexagons, and channel sizes over a relative broad range of channel diameters ranges from fractions of a millimeter to centimeters or more.

Monolithic catalysts are commonly used in the treatment of automotive exhaust gases, and their use in three-phase catalytic reactions has been the focus of recent studies. Included among the latter is the monograph "The Use of Monolithic Catalysts for Three-Phase Reactions" by S. Irandoust, A. Cybulski, and J. A. Moulijn in Structured Catalysts and Reactors, edited by A. Cybulski and J. Moulijn, Marcel, Dekker, New York 1998.

In a monolithic catalytic reactor employed in a three-phase reaction, a feed stream comprising a combination of reactant gases and reactant liquids is passed through the channels of the honeycomb. Feed stream flow may be in a co-current (gas and liquid flowing in the same direction) or counter-current (gas and liquid flowing in opposite directions) flow mode.

For certain velocities and volumetric ratios of the gas to the reactant liquid, and particularly in co-current flow modes, the flow of the mixture is segmented as a sequence of gas bubbles and liquid plugs of similar size, with an absence or only small quantity of gas in the reactant liquid plugs. Segmented flow of this type is said to be in the Taylor or Taylor flow regime.

Taylor flow is presently considered to be a desirable flow mode for honeycomb monolith reactors because it provides a relatively thin layer of reactant solution against the channel walls past which the gas bubbles are conveyed. In addition, Taylor flow provides good recirculation within the liquid plugs. The thin layer and good recirculation promotes mass transfer in a monolithic catalyst reactor that can approach that of a slurry or packed bed reactor. When the segmented flow reaches the end of the reactor, it can be collected and the gas and liquid separated to both collect the product and recycle the gas.

The potential advantages of honeycomb monolith catalyst reactors over slurry and packed bed reactors are several. First, since the channels of the monolith are relatively open, there is only a small pressure drop across the entire reactor, and the drop can be two orders of magnitude lower than that of packed bed reactors. Further, monolithic reactors can resist the bed plugging seen in packed bed reactors and do not require any form of agitation. Thirdly, the monolith reactor can be easily scaled-up, because the scale-up implies merely adding a greater number of monolithic catalyst segments and adjusting the inlet flows. And finally, recovery of the catalyst is generally significantly easier than that of slurry reactors, since there is no filtration required.

Some potential problems of monolithic catalyst reactors include relatively poor heat dissipation and difficulty initiating and maintaining acceptable Taylor flow. For example, monoliths are presently manufactured only in relatively small sizes, such that honeycomb reactor packings may require the horizontal joining and/or vertical stacking of several catalyst sections. Particularly at horizontal junctions between vertically arranged catalyst layers, flow disturbances can disrupt the flow of gases and liquids through the individual honeycomb channels. This can make maintaining an acceptable Taylor flow difficult.

An additional problem is that, as the segmented flow proceeds through the reactor, the gas streams or bubbles can be depleted of gas due to reaction, which may move the stoichiometric and volumetric gas-to-liquid (G:L) ratios out of the ideal value to maintain Taylor or other desired flow modes. Prior art three-phase monolithic catalytic processes have no effective means for replenishing reactant gases to balance G:L ratios and maintain desired flow modes.

SUMMARY OF THE INVENTION

The present invention is generally directed to the use of multiple stages of gas injection along the length of a monolithic catalyst reactor composed of monolithic catalyst beds in series. The multi-staged injection maintains a desired volumetric gas to liquid volumetric ratio (G:L) (defined at the temperature and pressure of interest) in the monolith channels in order to maintain the segmented flow near or at the Taylor regime. The staged injection concept of the invention maintains the desired G:L locally in the monolith bed, while managing the overall stoichiometry of the reaction. The global G:L set by stoichiometry may be different than the desired local value.

The present inventive process is a general one that can be applied to many different three-phase reactions, examples of which include hydrogenation of olefins, dienes, styrenes, aromatics, and the reduction of partially oxidized species such as aldehydes to alcohols. The process is not limited to these reactions, but can be applied to any catalytic hydrogenation or hydrotreating process or process that utilizes a reactive gas and a feedstock liquid. Other reactions where the invention can provide improved efficiency in monolithic catalyst beds include nitration, amination, sulfonation, chlorination, sulfidation, cyanation, and fluorination. The flow management advantages of the invention extend to upward or downward co-current flow modes, and to certain counter-current flow modes as well.

The invention further encompasses a reactor for maintaining desired values of the G:L in a three-phase monolithic catalyst reactor, in order to maintain a segmented gas/liquid flow near or at a Taylor or other desirable flow regime. Since maintenance of proper segmented flow is most sensitive to the gas bubble component, the current invention maintains proper G:L ratios during a process by multi-staged injection of reactant gas into the bubble components of the segmented gas/liquid flow.

These and other features of the present invention are more fully set forth in the following description of illustrative embodiments of the invention.

DESCRIPTION OF THE DRAWINGS

The description is presented with reference to the accompanying drawings in which.

DETAILED DESCRIPTION

Figure 1:
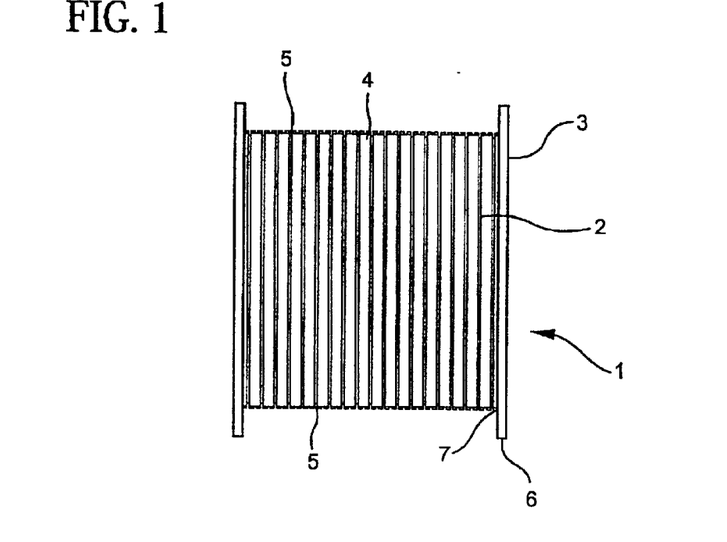
FIG. 1 is a schematic longitudinal cross-sectional side view of a monolithic catalyst bed.

As illustrated in the longitudinal cross-section in FIG. 1, a monolithic catalyst bed (1) is composed one or more monolith catalytic element (2) inside the walls (3) of a reactor that can have any polygonal or curved cross section. The channels (4) of the monolith are rendered catalytically active through the incorporation of catalysts in the walls, impregnation of the walls with solutions of catalytic metals, or other means which are well known in the art. The specific means and conditions of impregnation, the selection of the catalytic metals, and the presence or absence of promoters (either in the monolith or impregnating solution) will be selected depending upon the particular reaction to be conducted through the use of techniques well known to those of ordinary skill in the art.

Figure 2:
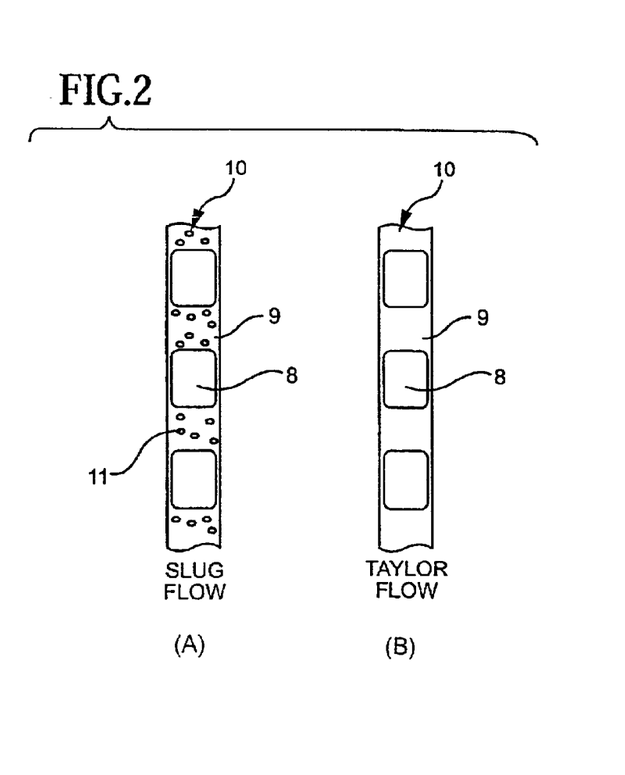
FIG. 2 is a pictorial representation of slug flow and plug or Taylor flow.

The channels of the monolith are typically substantially parallel to each other and to the direction of feed stream flow through the reactor, and thereby promote the initiation of segmented gas/liquid flow as illustrated in FIG. 2, and described below. The monolith catalytic elements are preferably supported within the reactor by some porous mechanical means (5) such as mesh elements, sintered porous metal plates, support plates with holes or other gas and liquid permeable support means. When a containerized catalyst element is desired, the mechanical means for confining the monolith catalytic elements can be flush with the bottom (6) of the reactor or recessed (7) slightly within the reactor.

The monolithic catalyst reactors of the present invention are composed of a series of monolithic catalyst beds operated with co-current upward or co-current downward segmented gas/liquid flow. Appropriately segmented flow within the monolithic catalyst beds can result in very efficient chemical processes.

One important parameter for proper segmented gas/liquid flow in monolith channels is the volumetric gas (G) to liquid (L) ratio (G:L). It has been reported in the art that a particular flow regime, termed Taylor flow, improves mass transfer between gas and liquid phases and increases the rate of hydrogenation in monolith catalysts. Taylor flow is illustrated schematically in FIG. 2.

In Taylor flow, alternating bubbles of gas (8) and liquid plugs (9) travel through the monolith channels (10) where there is an absence or very few gas bubbles (11) present in the liquid plug. In the description of the current invention, slug flow is taken to mean a segmented gas/liquid flow in which there are small bubbles of gas present in the liquid slugs. Plug flow is taken to mean a segmented flow in which there are no, or comparatively few, gas bubbles in the liquid plug. For the purpose of this disclosure, plug flow includes Taylor flow wherein the gas bubbles and liquid plugs are of the same order of magnitude in size. Also for the purposes of this disclosure, when a flow is described as near or at the Taylor regime, what is meant is a segmented flow in a range where the limits are slug flow as illustrated in FIG. 2 as (A) and theoretical Taylor flow as illustrated in FIG. 2 as (B).

The Taylor flow regime occurs under certain narrow conditions of volumetric G:L, nominally in a 1:1 ratio, although Taylor flow in some circumstances may be observed at G:L ratios anywhere in the range of 0.1–10. At ratios near 1:1, the gas bubble is about the same size as the liquid slug. The volumetric G:L in the monolith channels is what is referred to here as the local value. As a reaction takes place inside the monolith, gas consumption occurs, and the volumetric G:L ratio is changing all along the monolith. These changes in volumetric G:L ratio can disrupt the Taylor flow, and hence decrease process efficiency.

In many catalytic hydrogenation processes, the total volume of hydrogen consumed at reaction conditions divided by the volume of liquid fed to the reactor is a number significantly greater than one. The stoichiometric G:L ratio is typically about 10:1 or more. Moreover, excess hydrogen above that required by stoichiometry is often almost employed for the purpose of reducing catalyst deactivation. Hence the overall hydrogen to liquid feed ratio required for any given reaction may be greater than 10:1.

What is provided in accordance with the invention is a process using a monolithic catalyst reactor wherein hydrogen consumed by reaction is periodically replenished. Replenishment is at a rate effective to maintain a low local volumetric G:L value for flow mode control, while still providing the quantity of hydrogen necessary for catalyst protection and overall reaction stoichiometry. This is accomplished by injecting hydrogen at several points along the length of the reactor, e.g., to maintain Taylor flow locally at a volumetric G:L ratios around one, while managing a much higher stoichiometric-based G:L ratio for the hydrogenation reaction involved. This maximizes the catalytic function of monolith catalysts, taking full advantage of the enhanced mass transfer and catalytic processing capability of the monolith when operated near or at Taylor flow.

Figure 3:
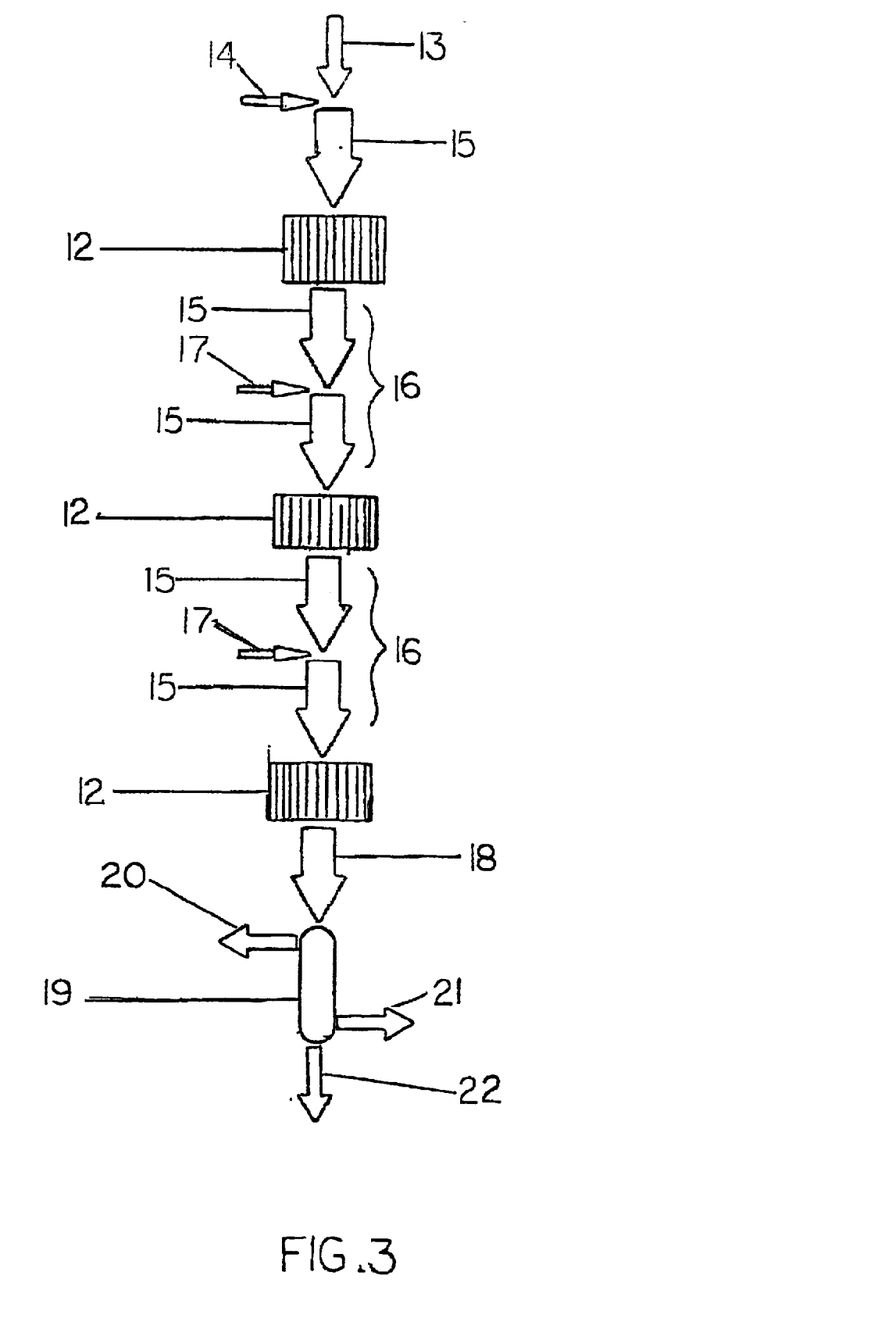
FIG. 3 is a schematic flow diagram of the process for maintaining desired G:L liquid ratios throughout a monolithic catalyst bed.

FIG. 3 illustrates a preferred block flow diagram for an illustrative reactor embodying the present invention. One of skill in the art should appreciate that the drawing is not meant specifically to convey either an upward or downward segmented flow. A segmented flow within the catalyst bed (12) is initiated by introducing both a reactant liquid feed stream (13) for example an unsaturated organic compound, and a reactive gas (14) for example hydrogen at predetermined volumes and predetermined flow rates.

As the segmented flow of the reactive gas and liquid through the monolith catalyst beds proceeds, at least a portion of the unsaturated compound is catalytically hydrogenated to give a partially reacted fluid (15) that eventually exits the catalyst bed. It can readily be appreciated that, as the flow proceeds through the catalyst bed, part of the hydrogen gas is consumed by the reaction in the monolith channels, and the gas consumption affects the gas bubble disproportionately greater than the liquid slug. To correct this problem in the reactor and to maintain the segmented flow near or at the Taylor regime, additional hydrogen is injected (17) between the outlet of the first bed and inlet of the second bed while the partially reacted fluid (15) from the first monolithic catalyst bed continues on to the second monolithic catalytic bed.

The gas injection process (16) can be repeated at each junction of monolithic catalyst beds as often as needed to replenish the gas consumed during the process. Means for periodically injecting the gas are positioned along the length of the reactor so as to maintain the segmented flow near or at the Taylor regime; in this way, the local volumetric G:L ratio in each bed is maintained in a range compatible with Taylor-flow requirements.

In general, injection will preferably occur at a break between beds, because the segmented flow in each monolith channel is isolated from the segmented flow in other channels. One of skill in the art will appreciate that gas or liquid injections that are perpendicular to the channels of the monolith catalyst bed are not convenient due to the relatively nonporous nature of the monolith. The product mixture (18) is collected at the end of the reactor in a gas/liquid separator (19) and both the gas (20) and the liquid (21) optionally can be recycled before the final product liquid is collected (22) and sent for further processing as may be required.

One illustrative embodiment of the current invention is an apparatus for hydrogenation using monolithic catalyst beds. The apparatus includes: at least two monolithic catalyst beds in series, wherein each catalyst bed has an inlet end and a outlet end and a direction of flow from the inlet end to the outlet end. Preferably the direction of flow is substantially parallel to the axial alignment of the channels of the monolithic catalyst bed.

The illustrative embodiment also includes a controllable gas injector that is in fluid communication with the inlet end of the first catalyst bed and a controllable liquid injector that is also in fluid communication with the inlet end of the first catalyst bed. A connector for controllably injecting hydrogen is sealably secured between the outlet end of the first catalyst bed and the inlet end of a subsequent catalyst bed.

The hydrogenation reactor also includes a collecting and separating apparatus for the hydrogen gas and the reactant liquid at the bottom of the last of the catalyst beds. Of course other components needed for the operation of the reactor may be included depending upon the particular reaction being conducted and reaction conditions to be maintained. Such components may include, a suitably sized reaction containment vessel; pumps, valves, pipes and other such fluid control means for feeding the reactor and removing the desired product; temperature, pressure and other desired safety and reaction monitoring controls and electronics which may be needed to control and operate the reactor safely. Any such additional equipment and apparatus can readily be identified and adapted to their intended purpose by those of ordinary skill in the art of reactor design and chemical engineering.

Figure 4:
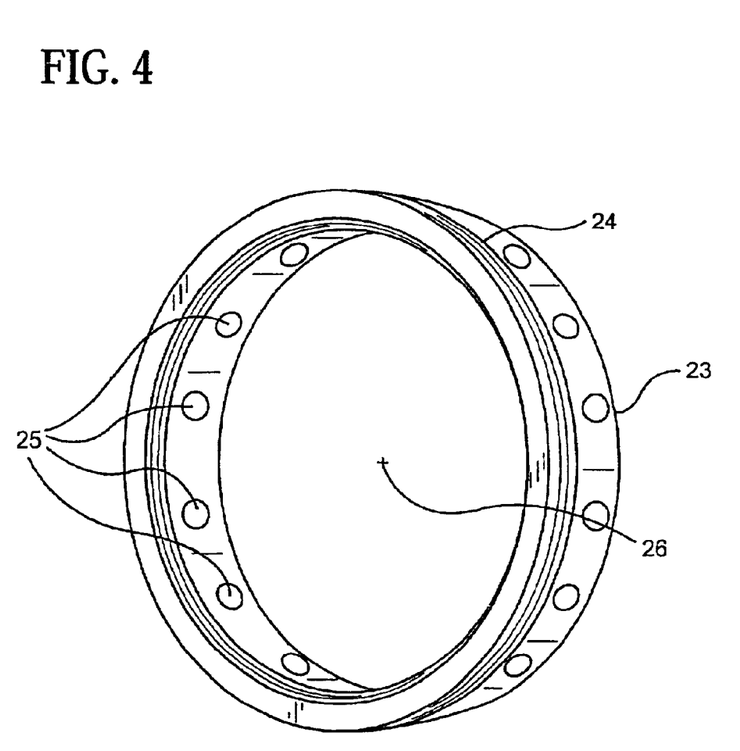
FIG. 4 is an perspective view of one embodiment of the gas injecting connector of the present invention.

One illustrative injecting connector of the present invention is shown in FIG. 4 that integrates important functions of the current invention. As shown, the injecting connector (23) is ring shaped and has an inner cylindrical wall and an outer cylindrical wall. The injecting connector has a first catalyst bed seat (24) and a second catalyst bed seat (not shown) on opposite ends and which are connected to both the inner cylindrical wall and the outer cylindrical wall so as to define a manifold area (not shown). Each catalyst bed seat is designed such that the catalyst bed seat can accept and sealably fix to the ends of two different monolithic catalyst beds.

The inside cylinder walls of the injecting connector contain ports (25) capable of controllably injecting portions of an externally supplied gas into the hollow center (26) of the connector as defined by the inner cylindrical wall. The ports are in fluid communication with the manifold area that in turn is in fluid communication with a gas inlet connector (not shown). The gas inlet connector is a portion of the outer cylindrical wall that is in fluid communication with a source of gas and also is in fluid communication with the manifold area.

The injecting connector serves as a spacer between catalyst beds that can be sealably fixed to the catalyst beds, and which allows for rapid assembly of a reactor containing several monolithic catalyst beds in a series as previously described above. The injecting connector may be designed such that it supports the monolithic catalyst bed above it, but this need not be a requirement. The injecting connector is primarily the means for gas injection into the intrabed space between monolithic catalyst beds of the reactor.

Use of a connector such as that shown in FIG. 5 will provide many advantages that will be apparent to those of ordinary skill in the art. Examples of such benefits include: a) a slight decrease in the pressure drop of a reactor built with monolith catalysts separated by these connectors/injectors; b) the gas bubble and liquid slug distribution is not impacted by the connector/injector design; and c) the connector/injectors could have a serial link that would lead to a very precise control of the flow rate of the injected gas.

Variables that can be used to manage the local G:L ratio include the number of staged injection points, the amount of excess hydrogen desired, and the ability to recycle a portion of the product liquid back to the reactor inlet. These variables can be combined in different ways to achieve the same average G:L ratio across each catalyst bed.

Tables 1 & 2 below show some representative calculations for a reaction system with the same overall stoichiometry. Table 1 tabulates a process where 7 stages can be used with 25% excess hydrogen and 7% liquid recycle to give an average G:L of 1. Table 2 tabulates a process where 10 stages can be used with 50% excess hydrogen and no liquid recycle.

TABLE 1

HYDROGENATION REACTOR - MULTIPLE STAGED INJECTION

| Parameter | Value |
|---|---|
| Liquid Fresh Feed | 1.0 |
| Gas:Liquid Stoichiometry | 10.0 |
| Gas Excess % | 25% |
| Liquid Recycle Ratio | 7% |
| Solver Parameter | 7.00 |
| # of Stages | 7 |
| Gas Consumed | 10.0 |
| Gas Total | 12.50 |
| Gas:Liquid Overall | 12.50 |
| Gas:Liquid Exit | 2.34 |

| Stage | 1 | 2 | 3 | 4 | 5 | 6 | 7 | Total |
|---|---|---|---|---|---|---|---|---|
| Liquid in | 1.07 | 1.07 | 1.07 | 1.07 | 1.07 | 1.07 | 1.07 | 1.07 |
| Gas in | 1.79 | 1.79 | 1.79 | 1.79 | 1.79 | 1.79 | 1.79 | 12.50 |
| Liquid Out | 1.07 | 1.07 | 1.07 | 1.07 | 1.07 | 1.07 | 1.07 | 1.07 |
| Gas Out | 0.36 | 0.36 | 0.36 | 0.36 | 0.36 | 0.36 | 0.36 | 2.50 |
| $H_2$ Consumed | 1.43 | 1.43 | 1.43 | 1.43 | 1.43 | 1.43 | 1.43 | 10.00 |
| Local Gas:Liquid Inlet | 1.67 | 1.67 | 1.67 | 1.67 | 1.67 | 1.67 | 1.67 | 1.67 |
| Local Gas:Liquid Outlet | 0.33 | 0.33 | 0.33 | 0.33 | 0.33 | 0.33 | 0.33 | 0.33 |
| Local Gas:Liquid Average | 1.00 | 1.00 | 1.00 | 1.00 | 1.00 | 1.00 | 1.00 | 1.00 |
| Local Liquid:Gas Inlet | 0.60 | 0.60 | 0.60 | 0.60 | 0.60 | 0.60 | 0.60 | 0.60 |

TABLE 2

HYDROGENATION REACTOR - MULTIPLE STAGED INJECTION

| Parameter | Value |
|---|---|
| Liquid Fresh Feed | 1.0 |
| Gas:Liquid Stoichiometry | 10.0 |
| Gas Excess % | 50% |
| Liquid Recycle Ratio | 0% |
| Solver Parameter | 10.00 |
| # of Stages | 10 |
| Gas Consumed | 10.0 |
| Gas Total | 14.98 |
| Gas:Liquid Overall | 14.98 |
| Gas:Liquid Exit | 4.98 |

| Stage | 1 | 2 | 3 | 4 | 5 | 6 | 7 | 8 | 9 | 10 | Total |
|---|---|---|---|---|---|---|---|---|---|---|---|
| Liquid in | 1.00 | 1.00 | 1.00 | 1.00 | 1.00 | 1.00 | 1.00 | 1.00 | 1.00 | 1.00 | 1.07 |
| Gas in | 1.50 | 1.50 | 1.50 | 1.50 | 1.50 | 1.50 | 1.50 | 1.50 | 1.50 | 1.50 | 14.98 |
| Liquid Out | 1.00 | 1.00 | 1.00 | 1.00 | 1.00 | 1.00 | 1.00 | 1.00 | 1.00 | 1.00 | 1.00 |
| Gas Out | 0.50 | 0.50 | 0.50 | 0.50 | 0.50 | 0.50 | 0.50 | 0.50 | 0.50 | 0.50 | 4.98 |
| $H_2$ Consumed | 1.00 | 1.00 | 1.00 | 1.00 | 1.00 | 1.00 | 1.00 | 1.00 | 1.00 | 1.00 | 10.00 |
| Local Gas:Liquid Inlet | 1.50 | 1.50 | 1.50 | 1.50 | 1.50 | 1.50 | 1.50 | 1.50 | 1.50 | 1.50 | 1.50 |
| Local Gas:Liquid Outlet | 0.50 | 0.50 | 0.50 | 0.50 | 0.50 | 0.50 | 0.50 | 0.50 | 0.50 | 0.50 | 0.50 |
| Local Gas:Liquid Average | 1.00 | 1.00 | 1.00 | 1.00 | 1.00 | 1.00 | 1.00 | 1.00 | 1.00 | 1.00 | 1.00 |
| Local Liquid:Gas Inlet | 0.67 | 0.67 | 0.67 | 0.67 | 0.67 | 0.67 | 0.67 | 0.67 | 0.67 | 0.67 | 0.67 |

As is apparent from the foregoing data, another aspect of the invention is a method for maintaining a ratio of gas volume to liquid volume in a segmented gas/liquid flow along a reactor containing monolithic catalyst beds in series. Such an illustrative method includes: initiating the segmented gas/liquid flow at a first end of the reactor by introducing feed liquid and feed gas both at a predetermined volume and a predetermined flow rate; injecting additional amounts of gas at least once into any of the spaces between catalyst beds; and collecting the segmented gas/liquid flow at a second end of the reactor.

In one embodiment the number of the monolithic catalyst beds in series is at least two and may be any number as may be required based on the reactor size and the catalytic activity of the catalyst. It is preferred that the monolithic catalyst beds in series are joined together by a connector for injecting gas. The segmented gas/liquid flow may be co-current down or co-current up depending upon the desired reactor configuration so long as the segmented gas/liquid flow is maintained near or at the Taylor regime.

In one preferred illustrative embodiment, the internal diameter of the channels of the monolith catalytic elements in the monolithic catalyst beds is in a range from about 0.5 millimeters to about 6 millimeters. The monolithic catalyst bed may be selected to carry out a number of differing reactions in which gas to liquid contact of reactants is needed. Examples of such reactions include hydrogenation, oxidation, and carbonlyation.

The method of the present illustrative embodiment may be carried out such that the gas may be selected from the group consisting of: hydrogen, oxygen, carbon monoxide, chlorine, fluorine, nitric oxide, nitrogen dioxide, nitrous oxide, nitric acid, ammonia, sulfur dioxide, sulfur trioxide, hydrogen chloride, hydrogen cyanide, hydrogen sulfide, hydrogen fluoride and mixtures of these. It is also within the concept of the present invention that the gas is a mixture of reactive gases and inert gases. Preferably, the reactive gas may be selected from hydrogen, oxygen, carbon monoxide and mixtures of these, and the inert gases are selected from the group consisting of helium, nitrogen, argon, carbon dioxide, methane, ethane, propane, and mixtures of these.

The ratio of gas volume to liquid volume may be initiated or maintained at values appropriate for the particular reaction of interest; values of 1:1 with the gas volume being stated as actual volume under the pre-selected reaction pressure are suitable.

The illustrative method may also include the steps of: separating the gas and the product-containing liquid; recycling the gas and the product-containing liquid through the reactor; and recovering the desired product from the product containing liquid.

Another illustrative embodiment of the present invention includes a method for maintaining the ratio of gas volume to reactant liquid volume in a gas/liquid segmented flow in order to maintain the segmented flow near or at the Taylor regime along a reactor. Such an illustrative method includes: initiating a segmented gas/liquid flow at the start of a first monolithic catalyst bed by introducing a reactant liquid and gas into the first monolithic catalyst bed; propagating the segmented flow by introducing more of each of the reactant liquid and the gas at the start of a first monolithic catalyst bed as the segmented gas/liquid flow passes through the catalyst beds; controllably injecting gas at least once into at least one connector interposed between the monolithic catalyst beds; and collecting the gas and product containing liquid at the bottom of the last of the monolithic catalyst beds.

The monolithic catalyst beds of the present illustrative embodiment have a plurality of channels that are preferably axially aligned along the path of overall flow through the reactor. It is preferred that the segmented flow be either co-current down or co-current up. It is further preferred within the present illustrative embodiment that the internal diameter of the channels of the monolith catalytic elements is in a range from about 0.5 millimeters to about 6 millimeters.

The catalyst impregnated onto the monolithic support may be selected so as to carry out the desire reaction, but preferably it may be selected such that the method may be used to carry out reactions such as hydrogenation, oxidation, and carbonlyation reactions.

The reactant liquid used in the present illustrative method may be any desired feedstock fluid but is preferably an unsaturated hydrocarbon or substituted hydrocarbon including sulfur- or nitrogen-containing substitutents. The gas may be selected from hydrogen, oxygen, carbon monoxide, chlorine, fluorine, nitric oxide, nitrogen dioxide, nitrous oxide, nitric acid, ammonia, sulfur dioxide, sulfur trioxide, hydrogen chloride, hydrogen cyanide, hydrogen sulfide, hydrogen fluoride or mixtures of these, and these can be used alone or in mixtures of a reactive gas and an inert gas. Again, the inert gas may be chosen from helium, nitrogen, argon, carbon dioxide, methane, ethane, propane, and mixtures of these. Desirably the ratio of gas to liquid volumes will be sufficient to maintain Taylor flow through the channels of the monolithic catalyst bed. Again, the gas to liquid volumetric ratio may be selected as appropriate for the particular reaction involved, but volumetric ratios near 1 (taking the gas volume as the volume at actual reactor pressure) are well suited to maintain Taylor flow.

The present illustrative method may optionally include the steps of: separating the gas and the product containing liquid; recycling the gas and the product containing liquid through the reactor; and recovering product from the product containing liquid.

The present invention also encompasses a reactor that utilizes a monolithic catalyst bed. Such an illustrative apparatus includes: at least two monolithic catalytic beds in series. Each catalyst bed should be arraigned within the reactor such that it has an inlet end and an outlet end and a direction of flow from the inlet end to the outlet end. Preferably the direction of flow is substantially parallel to the axial alignment of the channels of the monolithic catalyst bed.

The present illustrative reactor also includes a controllable gas injector connected to the inlet end of the first catalyst bed and a controllable liquid injector at the inlet end of the first catalyst bed. Between each bed should be a connector for controllably injecting gas into the reactor. The connector is such that it is sealably secured between the outlet end of the first catalyst bed and the inlet end of a subsequent bed. Lastly in the present illustrative embodiment of the present invention, there is a collecting and separating apparatus for the gas and the reactant liquid at the bottom of the last of the catalyst beds.

The monolithic catalyst beds of the present illustrative embodiment have a plurality of channels that are preferably axially aligned along the path of overall flow through the reactor and preferably the channels are substantially parallel to the direction of flow from the inlet end to the outlet end of the catalyst bed. It is preferred that the segmented flow be co-current flow in either a downwardly or upwardly direction through the reactor. It is further preferred within the present illustrative embodiment that the internal diameter of the channels of the monolith catalytic elements is in a range from about 0.5 millimeters to about 6 millimeters.

The catalyst impregnated onto the monolithic support may be selected so as to carry out the desire reaction, but preferably it may be selected such that the reactor may be used to carry out reactions such as hydrogenation, oxidation, and carbonlyation reactions.

The reactant liquid used in the present illustrative reactor may be any desired feedstock fluid but is preferably an unsaturated hydrocarbon or a substituted hydrocarbon incorporating additional substituents such as sulfur- or nitrogen-containing moieties. The reactant gas may be selected from hydrogen, oxygen, carbon monoxide, chlorine, fluorine, nitric oxide, nitrogen dioxide, nitrous oxide, nitric acid, ammonia, sulfur dioxide, sulfur trioxide, hydrogen chloride, hydrogen cyanide, hydrogen sulfide, hydrogen fluoride and mixtures of these. Alternatively the gas may be a mixture of a reactive gas and an inert gas. Preferably the reactive gas will be selected from hydrogen, oxygen, carbon monoxide, and mixtures of these, and the inert gas may be chosen from helium, nitrogen, argon, carbon dioxide, methane, ethane, propane, and mixtures of these.

The ratio of gas to liquid volumes is desirably effective to maintain Taylor flow through the channels of the monolithic catalyst bed. The gas to liquid volumetric ratio will be in a range appropriate for the particular reaction selected; a volumetric ratio of 1 or approximately 1 with the gas volume being measured at actual reaction pressures will normally be useful where Taylor flow is being maintained.

While the apparatus, compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method for maintaining a ratio of gas volume to liquid volume in a segmented gas/liquid flow along a reactor containing monolithic catalyst beds in series, the method comprising:
   initiating the segmented gas/liquid flow at a first end of the reactor by introducing feed liquid and feed gas both at a predetermined volume and a predetermined flow rate;
   propagating the segmented flow through the monolithic catalyst beds
   injecting additional amounts of gas at least once into the spaces between the monolithic catalyst beds;
   collecting the segmented gas/liquid flow at a second end of the reactor.

2. The method of claim 1, wherein the number of the monolithic catalyst beds in series is at least two.

3. The method of claim 2, wherein the monolithic catalyst beds in series are joined together by a connector for injecting gas.

4. The method of claim 3, wherein the segmented gas/liquid flow is co-current flow in a downwardly or upwardly direction through the catalyst bed.

5. The method of claim 4, wherein the segmented gas/liquid flow is maintained within the Taylor flow regime.

6. The method of claim 5, wherein the gas is selected from the group consisting of: hydrogen, oxygen, carbon monoxide, chlorine, fluorine, nitric oxide, nitrogen dioxide, nitrous oxide, nitric acid, ammonia, sulfur dioxide, sulfur trioxide, hydrogen chloride, hydrogen cyanide, hydrogen sulfide, hydrogen fluoride, and mixtures thereof.

7. The method of claim 5, wherein the gas is a mixture of reactive gases and inert gases, the reactive gases being selected from the group consisting of hydrogen, oxygen, carbon monoxide and mixtures thereof and the inert gases being selected from the group consisting of helium, nitrogen, argon, carbon dioxide, methane, ethane, propane, and mixtures thereof.

8. The method of claim 5, wherein the monolithic catalyst bed is selected to carry out reactions selected from the group consisting of hydrogenation, oxidation, carbonylation, nitration, amination, sulfonation, chlorination, sulfidation, cyanation, or fluorination.

9. The method of claim 5, wherein the ratio of gas volume to liquid volume has a value in the range of 0.1–10 at the pressure in the reactor.

10. The method of claim 1, further comprising the steps of:
    separating the gas/liquid flow at the second end of the reactor into a gas and a product containing liquid;
    recycling the gas and the product containing liquid through the reactor; and
    recovering product from the product containing liquid.

11. A method for maintaining the ratio of gas volume to reactant liquid volume in a gas/liquid segmented flow in order to maintain the segmented flow within the Taylor flow regime along a reactor containing a plurality of monolithic catalyst beds, the beds having axially aligned channels and in which at least two beds define an intrabed space, the method comprising:
    initiating a segmented gas/liquid flow at the start of a first monolithic catalyst bed by introducing a reactant liquid and gas into the axially aligned channels;
    propagating the segmented flow by introducing more of each of the reactant liquid and the gas at the start of a first monolithic catalyst bed as the segmented gas/liquid flow passes through the catalyst beds;
    injecting an additional amount of gas into the reactor into the intrabed space; and
    collecting the gas and product containing liquid at the bottom of the last of the 12. The method of claim 11, wherein the gas is selected from the group consisting of hydrogen, oxygen, carbon monoxide, chlorine, fluorine, nitric oxide, nitrogen dioxide, nitrous oxide, nitric acid, ammonia, sulfur dioxide, sulfur trioxide, hydrogen chloride, hydrogen cyanide, hydrogen sulfide, hydrogen fluoride, and mixtures thereof.

13. The method of claim 11, wherein the gas is a mixture of reactive gases and inert gases, the reactive gases being selected from the group consisting of hydrogen, oxygen, carbon monoxide, and mixtures thereof and the inert gases being selected from the group consisting of helium, nitrogen, argon, carbon dioxide, methane, ethane, propane, and mixtures thereof.

14. The method of claim 11, wherein the segmented flow is co-current flow in a downwardly or upwardly direction through the reactor.

15. The method of claim 11, wherein the internal diameter of the channels of the monolith catalytic elements is in a range from about 0.5 millimeters to about 6 millimeters.

16. The method of claim 11, wherein the gas to liquid volumetric ratio is in the range of 0.1–10 at the pressure within the reactor.

17. The method of claim 11, further comprising the steps of:
- separating the gas and the product containing liquid;
- recycling the gas and the product containing liquid through the reactor; and
- recovering product from the product containing liquid.

18. The method of claim 11, wherein the monolithic catalyst bed is selected to effect reactions selected from the group consisting of hydrogenation, oxidation, and carbonlyation.

19. A method for maintaining a ratio of gas volume to liquid volume in a segmented gas/liquid flow along a reactor containing at least a first monolithic catalyst bed and a second monolithic catalyst bed, the monolithic catalyst beds being in series and being separated by an intra-bed space, the method comprising:
- initiating segmented gas/liquid flow within the first monolithic catalyst bed by introducing feed liquid and feed gas both at a predetermined volume and a predetermined flow rate;
- propagating the segmented flow through the first monolithic catalyst bed;
- injecting an additional amount of gas into the reactor into the intrabed space between the first monolithic catalyst bed and the second monolithic catalyst bed;
- initiating segmented gas/liquid flow within the second monolithic catalyst bed by introducing feed liquid and feed gas both at a predetermined volume and a predetermined flow rate;
- propagating the segmented flow through the second monolithic catalyst bed; and
- collecting the segmented gas/liquid flow from the reactor.

20. A method for maintaining a ratio of gas volume to liquid volume in a segmented gas/liquid flow along a reactor containing at least a first monolithic catalyst bed and a second monolithic catalyst bed, the monolithic catalyst beds being in series and being separated by an intra-bed space, the method comprising:
- initiating segmented gas/liquid flow within the first monolithic catalyst bed by introducing feed liquid and feed gas both at a predetermined volume and a predetermined flow rate;
- propagating the segmented flow through the first monolithic catalyst bed;
- injecting an additional amount of gas into the reactor into the intrabed space using an injecting connector that is sealably connected to the first monolithic catalyst bed and the second monolithic catalyst bed;
- initiating segmented gas/liquid flow within the second monolithic catalyst bed by introducing feed liquid and feed gas both at a predetermined volume and a predetermined flow rate;
- propagating the segmented flow through the second monolithic catalyst bed; and
- collecting the segmented gas/liquid flow from the reactor.

* * * * *

UNITED STATES PATENT AND TRADEMARK OFFICE
CERTIFICATE OF CORRECTION

PATENT NO. : 6,822,128 B2
DATED : November 23, 2004
INVENTOR(S) : Letourneur et al.

It is certified that error appears in the above-identified patent and that said Letters Patent is hereby corrected as shown below:

Column 12,
Line 45, "bottom of the last of the" should be -- bottom of the last of the catalyst beds --.

Signed and Sealed this

Twenty-fourth Day of May, 2005

JON W. DUDAS
*Director of the United States Patent and Trademark Office*